United States Patent
Murakami et al.

(10) Patent No.: US 9,027,963 B2
(45) Date of Patent: May 12, 2015

(54) TENSION MEMBER FOR AIRBAG, AND AIRBAG DEVICE

(75) Inventors: Yoshiki Murakami, Tokyo (JP); Kimihiro Koshikawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/239,953

(22) PCT Filed: Jul. 27, 2012

(86) PCT No.: PCT/JP2012/069175
§ 371 (c)(1),
(2), (4) Date: Feb. 20, 2014

(87) PCT Pub. No.: WO2013/027537
PCT Pub. Date: Feb. 28, 2013

(65) Prior Publication Data
US 2014/0191497 A1    Jul. 10, 2014

(30) Foreign Application Priority Data
Aug. 22, 2011   (JP) .................................. 2011-180485

(51) Int. Cl.
*B60R 21/2338*    (2011.01)
(52) U.S. Cl.
CPC ... *B60R 21/2338* (2013.01); *B60R 2021/23384* (2013.01)
(58) Field of Classification Search
USPC .............................................. 280/743.2, 731
See application file for complete search history.

(56) References Cited

U.S. PATENT DOCUMENTS

| 5,308,113 | A | | 5/1994 | Moriset | |
|---|---|---|---|---|---|
| 5,362,101 | A | * | 11/1994 | Sugiura et al. | ............. 280/743.2 |
| 5,489,119 | A | * | 2/1996 | Prescaro et al. | ........... 280/743.2 |
| 5,498,023 | A | * | 3/1996 | Adams et al. | .............. 280/728.2 |

(Continued)

FOREIGN PATENT DOCUMENTS

| JP | H06-191366 A | 7/1994 |
|---|---|---|
| JP | H07-277124 A | 10/1995 |

(Continued)

OTHER PUBLICATIONS

International Search Report from the International Bureau of WIPO for International Application No. PCT/JP2012/069175 dated Oct. 9, 2012 (2 pages).

*Primary Examiner* — Paul N Dickson
*Assistant Examiner* — Barry Gooden, Jr.
(74) *Attorney, Agent, or Firm* — Fitch Even Tabin & Flannery LLP

(57) ABSTRACT

A tension member for an airbag, and an airbag device are provided in each of which the tensile force is controlled continuously with a simple configuration. An airbag device includes an airbag that is normally folded and is inflated and deployed in a case of an emergency, an inflator for supplying gas into the airbag, a retainer for retaining the airbag and the inflator, and a tension member that controls a shape or a function of the airbag by using tension. The tension member for an airbag includes two end portions connected to respective portions of the airbag that are movable relative to each other when the airbag is inflated and deployed, a widened portion provided between the two end portions, and a breaking section provided in the widened portion in such a manner as to extend in a direction of widening of the widened portion and configured to break depending on a magnitude of tension applied between the two end portions.

10 Claims, 8 Drawing Sheets

(56) References Cited

U.S. PATENT DOCUMENTS

| | | | |
|---|---|---|---|
| 5,765,867 A * | 6/1998 | French | 280/743.2 |
| 5,997,037 A * | 12/1999 | Hill et al. | 280/743.2 |
| 6,502,858 B2 * | 1/2003 | Amamori | 280/743.2 |
| 6,598,903 B2 * | 7/2003 | Okada et al. | 280/743.2 |
| 6,955,377 B2 * | 10/2005 | Cooper et al. | 280/743.1 |
| 7,093,854 B2 * | 8/2006 | Fischer et al. | 280/743.2 |
| 7,128,337 B2 * | 10/2006 | Kwon | 280/743.1 |
| 7,152,875 B2 * | 12/2006 | Kai | 280/739 |
| 7,264,270 B2 * | 9/2007 | Miyata et al. | 280/743.2 |
| 7,621,561 B2 * | 11/2009 | Thomas et al. | 280/743.2 |
| 7,722,080 B2 * | 5/2010 | Rose et al. | 280/743.2 |
| 7,883,110 B2 * | 2/2011 | Pausch | 280/739 |
| 7,922,200 B2 * | 4/2011 | Webber | 280/743.2 |
| 7,950,694 B2 * | 5/2011 | Kim et al. | 280/743.2 |
| 8,047,564 B2 * | 11/2011 | Kibat et al. | 280/730.2 |
| 8,220,112 B2 * | 7/2012 | Hofmann et al. | 24/265 R |
| 8,328,229 B2 * | 12/2012 | Wigger et al. | 280/730.1 |
| 8,544,883 B2 * | 10/2013 | Fischer et al. | 280/743.2 |
| 8,579,324 B2 * | 11/2013 | Kwon | 280/743.2 |
| 8,632,095 B2 * | 1/2014 | Fischer et al. | 280/743.2 |
| 2001/0035639 A1 * | 11/2001 | Amamori | 280/740 |
| 2002/0175511 A1 * | 11/2002 | Dunkle et al. | 280/743.2 |
| 2003/0189328 A1 * | 10/2003 | Cooper et al. | 280/743.2 |
| 2004/0256848 A1 * | 12/2004 | Miyata et al. | 280/743.2 |
| 2005/0057030 A1 * | 3/2005 | Fischer et al. | 280/743.2 |
| 2005/0082807 A1 * | 4/2005 | Kwon | 280/743.2 |
| 2007/0007757 A1 * | 1/2007 | Bauer et al. | 280/743.2 |
| 2007/0228710 A1 * | 10/2007 | Ishiguro et al. | 280/743.2 |
| 2008/0073892 A1 * | 3/2008 | Rose et al. | 280/739 |
| 2010/0019476 A1 * | 1/2010 | Pausch | 280/742 |
| 2011/0049852 A1 | 3/2011 | Kibat et al. | |
| 2014/0028006 A1 * | 1/2014 | Webber | 280/743.2 |

FOREIGN PATENT DOCUMENTS

| | | |
|---|---|---|
| JP | 2003-095047 A | 4/2003 |
| JP | 2003-170797 A | 6/2003 |
| JP | 2004-067074 A | 3/2004 |
| JP | 2005-193881 A | 7/2005 |
| JP | 2006-298018 A | 11/2006 |
| JP | 2006-341740 A | 12/2006 |
| JP | 2009-196551 A | 9/2009 |
| JP | 2009-298222 A | 12/2009 |
| JP | 2010-116010 A | 5/2010 |
| JP | 2011-057208 A | 3/2011 |

* cited by examiner

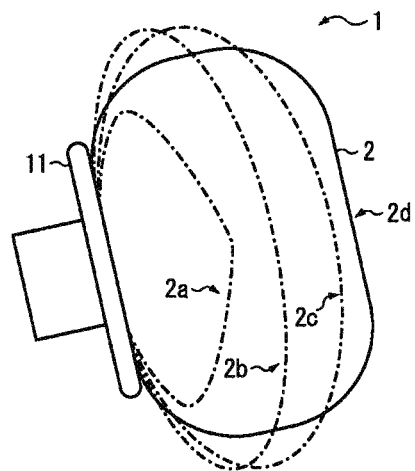
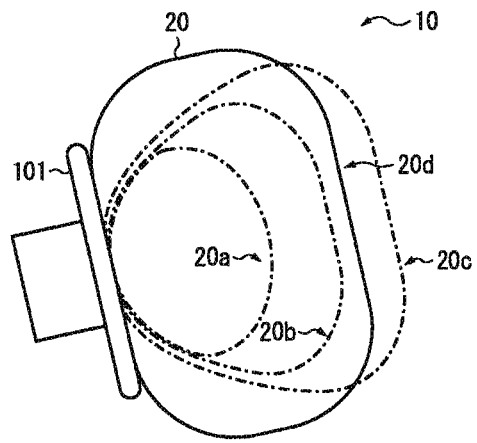
FIG. 4(A)　　　　　　　　　FIG. 4(B)
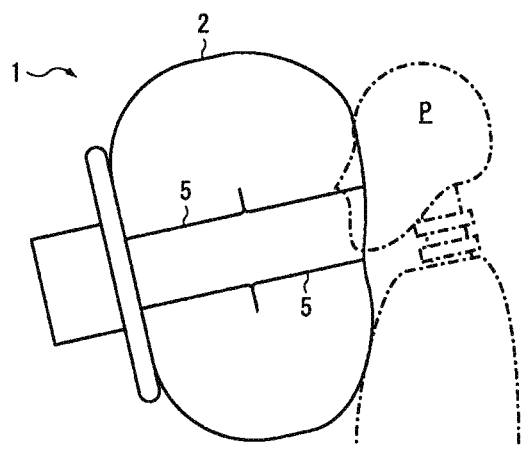
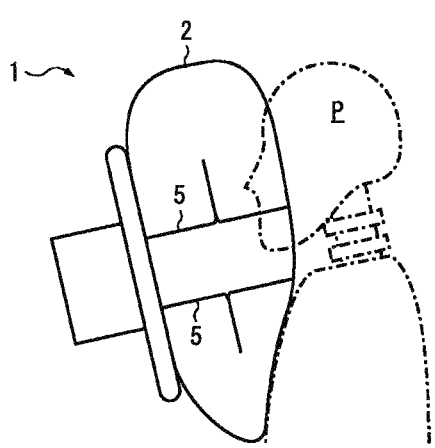
FIG. 4(C)　　　　　　　　　FIG. 4(D)

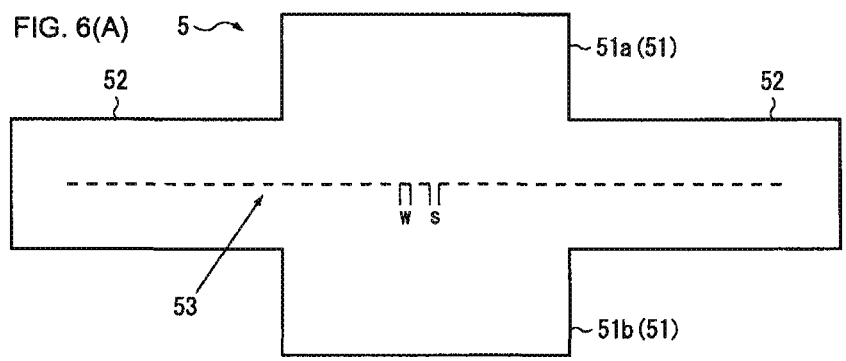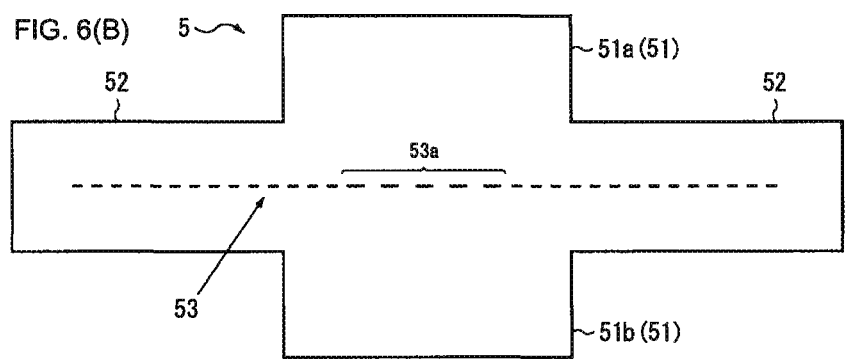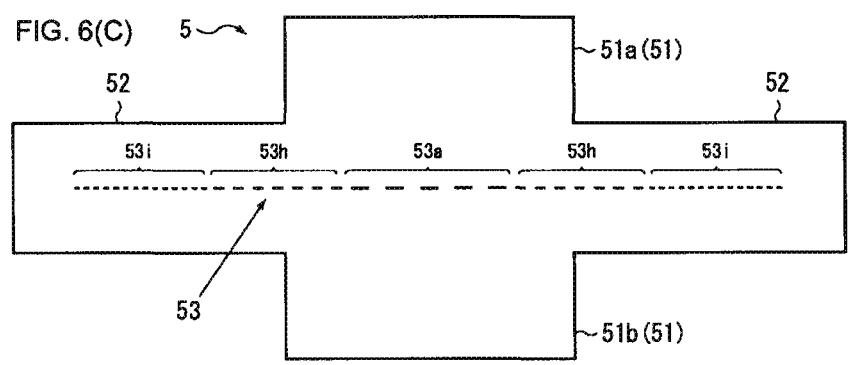

TENSION MEMBER FOR AIRBAG, AND AIRBAG DEVICE

CROSS-REFERENCE TO RELATED APPLICATIONS

This application is a U.S. national phase application filed under 35 U.S.C. §371 of International Application PCT/JP2012/069175, filed on Jul. 27, 2012, designating the United States, which claims priority from Japanese Patent Application No. 2011-180485, filed Aug. 22, 2011, which are hereby incorporated herein by reference in their entirety.

FIELD OF THE INVENTION

The present invention relates to tension members for airbags, and airbag devices, and in particular to a tension member for an airbag, and an airbag device that are suitable for controlling the shape of inflation and deployment of an airbag, the opening and closing of a vent hole, and so forth.

BACKGROUND OF THE INVENTION

It is general that vehicles such as an automobile include airbag devices that absorb impacts applied to occupants in the case of an emergency such as a collision or sudden deceleration by inflating and deploying airbags in the cabins of the vehicles. Different types of such airbag devices have been developed and employed, including a driver airbag device provided in a steering, a passenger airbag device provided in the instrument panel, a side airbag device provided in a side face of the vehicle or in a seat, a curtain airbag device provided in an upper part of a door, a knee airbag device intended for the knees of the occupant, and a pedestrian airbag device provided below the hood.

In general, the above airbag devices each include an airbag that is normally folded and is inflated and deployed in the case of an emergency, an inflator for supplying gas into the airbag, and a retainer for retaining the airbag and the inflator. Such an airbag may be provided with a tether that regulates the shape of inflation and deployment of the airbag or controls the opening and closing of a vent hole, for example (see Japanese Unexamined Patent Application Publication No. 2006-341740, Japanese Unexamined Patent Application Publication No. 07-277124, Japanese Patent No. 2677951, Japanese Unexamined Patent Application Publication No. 2003-095047, Japanese Patent No. 4666059, for example).

An airbag device disclosed by Japenese Unexamined Patent Application Publication No. 2006-341740 includes straps (tethers) provided in an airbag and that control the inflation. The straps each include a piece of base fabric having excellent stretchability, and a fiber member having a lower stretchability than the piece of base fabric. If the tensile force is small, the stretching of the strap is regulated by the fiber member. If the tensile force is large, the fiber member breaks and the piece of base fabric stretches with its stretchability.

An airbag device disclosed by Japenese Unexamined Patent Application Publication No. 07-277124 includes tethers connected to a bottom wall portion and to a top wall portion and that regulate the shape of inflation. The tethers are of two kinds: long and short ones. The long tether is for regulating the shape at the completion of the inflation. The short tether has a lower strength than the long tether and is connected to the bottom wall portion and to the top wall portion. When the airbag starts to be inflated and deployed, the short tether is first stretched. Accordingly, the distance between the bottom wall portion and the top wall portion is regulated, whereby the amount of projection of the airbag is regulated. Subsequently, the short tether breaks while the long tether is stretched, whereby the airbag is regulated to have a predetermined shape.

An airbag device disclosed by Japenese Patent No. 2677951 includes an inflation controlling member (tether) that controls the shape of an airbag. The inflation controlling member includes a releasable connected portion and an extendable portion. In an early stage of an inflation process, the releasable connected portion remains as it is while the inflation controlling member is extended to have an initial length. In an intermediate stage of the inflation process, the releasable connected portion is released, whereby the inflation controlling member is extended to have an intermediate length. In the final stage of the inflation process, the extendable portion is extended, whereby the inflation controlling member is extended to have a final length.

An airbag device disclosed by Japanese Unexamined Patent Application Publication No. 2003-095047 includes a tether that regulates the shape of inflation of an airbag. The tether includes a folded portion folded such that the tether is doubled, and a temporarily tacked portion (extension-amount-changeable means) where part of the doubled portion is tacked such that the tack is released when the internal pressure of the airbag exceeds a predetermined value. When the airbag starts to be inflated and deployed, the tether acts to retain the airbag to be in a first inflated state. When the internal pressure of the airbag exceeds the predetermined value, the tether acts to change the state of the airbag into a second inflated state.

An airbag device disclosed by Japanese Patent No. 4666059 includes opening-degree-changing means that changes the area of opening of a vent hole. The opening-degree-changing means includes a valve member and a tether. The valve member is capable of opening and closing the vent hole. The tether is connected at one end thereof to the valve member on the outside of the airbag and is also connected at the other end thereof to a top part of a piece of base fabric of the airbag that faces the occupant. When the airbag is deployed, the tether is stretched in the vertical direction of the vehicle in side view of the vehicle and urges the valve member in a closing direction. The tether acts as follows. In a state where the airbag has been completely inflated and deployed, the tether pulls the valve member in such a manner as to close the vent hole. When the occupant comes into contact with the airbag, the tether is loosened and acts to open the vent hole.

SUMMARY OF INVENTION

In the airbag device disclosed by Japanese Unexamined Patent Application Publication No. 2006-341740, pieces of base fabric having different degrees of elongation need to be provided and connected in parallel. Therefore, the configuration is complicated. Furthermore, the tethers need to be prepared individually in accordance with the tensile characteristic of the airbag. This leads to a problem of cost increase.

In the airbag device disclosed by Japanese Unexamined Patent Application Publication No. 07-277124, since two kinds of tethers that are long and short are employed, the shape of inflation and deployment of the airbag is not regulated during a period from when the short tether is broken until when the long tether starts to act. This leads to a problem in that the effect of shape regulation is small. Furthermore, even if three or more kinds of tethers having respectively different lengths are employed, the shape cannot be regulated in a continuous manner but in a graded manner. Moreover, if the difference between the grades of shape regulation is reduced, the number of tethers increases correspondingly, leading to cost increase and weight increase. In addition, if the shape of the airbag is not regulated in the process of inflation and deployment, a negative pressure may be generated in the airbag, leading to problems such as the gas not being diffused uniformly, or the gas not being exhausted from the vent hole.

The airbag device disclosed by Japanese Patent No. 2677951 has the same problem as in the case of Japanese Unexamined Patent Application Publication No. 2006-341740 because the tether includes pieces of base fabric (the stretchable portion and the pieces provided at both ends thereof) having different degrees of elongation that are connected in series. Furthermore, since the releasable connected portion of the tether joins the pieces by being interposed therebetween, the airbag device has the same problem as in the case of Japanese Unexamined Patent Application Publication No. 07-277124, that is, the effect of shape regulation is small. This is because the shape of inflation and deployment of the airbag is not regulated during a period from when the releasable connected portion is broken until when the tether is fully stretched.

The airbag device disclosed by Japanese Unexamined Patent Application Publication No. 2003-095047 has the same problem caused by the releasable connected portion disclosed by Japanese Patent No. 2677951 if the airbag device includes one temporarily tacked portion. If the entirety of the doubled portion forms the temporarily tacked portion as illustrated in FIG. 16 of Japanese Unexamined Patent Application Publication No. 2003-095047, the shape of inflation of the airbag can be regulated continuously. Nevertheless, if the doubled portion is formed by using adhesive or any sticky agent, it is difficult to maintain the environmental resistance (to exhibit a certain level of performance in a temperature range of −40° C. to 80° C., for example). If, alternatively, some parts of the doubled portion are stitched or fused so as to form tacked portions, the configuration becomes complicated, leading to a problem of poor practicality.

In the airbag device disclosed by Japanese Patent No. 4666059, the vent hole is kept closed during a period from when the airbag is completely inflated and deployed until when the occupant comes into contact with the airbag. However, during a period from the start to the completion of the inflation and deployment of the airbag, since the predetermined tension is not applied to the tether, the valve member cannot be pulled, making it difficult to keep the vent hole closed. Accordingly, the airbag device has a problem in that it is difficult to maintain the internal pressure of the airbag during the period until the airbag is completely inflated and deployed.

The present invention has been developed in view of the above problems and is to provide a tension member for an airbag, and an airbag device in each of which the tensile force is controlled substantially continuously with a simple configuration.

According to the present invention, there is provided a tension member for an airbag connected to an airbag that is normally folded and housed in a structure of a vehicle and is inflated and deployed with gas supplied thereinto in a case of an emergency, the tension member for the airbag being configured to control a shape or a function of the airbag by using tension. The tension member for the airbag includes two end portions connected to respective portions of the airbag that are movable relative to each other when the airbag is inflated and deployed, a widened portion provided between the two end portions, and a breaking section provided in the widened portion in such a manner as to extend in a direction of widening of the widened portion and configured to break in accordance with a level of tension applied between the two end portions.

Furthermore, according to the present invention, there is provided an airbag device including an airbag that is normally folded and is inflated and deployed in a case of an emergency, an inflator for supplying gas into the airbag, a retainer for retaining the airbag and the inflator, and a tension member for an airbag that controls a shape or a function of the airbag by using tension. The tension member for the airbag includes two end portions connected to respective portions of the airbag that are movable relative to each other when the airbag is inflated and deployed, a widened portion provided between the two end portions, and a breaking section provided in the widened portion in such a manner as to extend in a direction of widening of the widened portion and configured to break in accordance with a level of tension applied between the two end portions.

In each of the tension member for the airbag, and the above airbag device described above, the breaking section includes, for example, a plurality of incisions or openings each extending in a direction substantially perpendicular to the tension applied between the two end portions. The breaking section may be configured such that left portions thereof and right portions thereof break alternately. Furthermore, the breaking section may include an initially breaking portion provided in a central part thereof and configured to break uniformly in a lateral direction. Furthermore, the widened portion may include a stitched portion that stops the breakage of the breaking section. Furthermore, the stitched portion may have a stitch line extending, in a state where the widened portion is folded along the breaking section, from an end of the breaking section and being angled with respect to the direction of widening of the widened portion.

Furthermore, the widened portion may include an extended portion extending in a direction substantially perpendicular to the direction of widening, and the extended portion may include an extended breaking portion continuous with the breaking section and extending in a direction of extension thereof. Furthermore, the breaking section may be one of a plurality of breaking sections provided in the widened portion. Furthermore, a material of the tension member for the airbag may include threads running perpendicularly to the breaking section.

In the above airbag device, the tension member for the airbag is employed as, for example, a tether that regulates a thickness of the airbag, a tether that regulates an area of contact of the airbag, a tether that regulates a shape of the airbag, or a tether that regulates opening and closing of a vent hole provided in the airbag.

In each of the tension member for the airbag, and the airbag device according to the present invention described above, the widened portion of the tension member for the airbag includes the breaking section configured to break depending on the magnitude of the tension. Therefore, the configuration is simple, and the tensile force is applied substantially continuously over a period of time from the initial stage to the completing stage of the inflation and deployment of the airbag. Furthermore, according to the present invention described above, the following effects are produced: the shape of the airbag is regulated in the process of inflation and deployment of the airbag, the internal pressure of the airbag is maintained to be positive, the gas is diffused uniformly, the gas is exhausted normally from the vent hole, and so forth.

If the breaking section includes predetermined incisions or opening, the breaking section is formed without using any joining means such as stitching, bonding, or fusing; the breaking section is formed easily; and excellent environmental resistance is provided. These aspects are suitable for practical applications.

Since the breaking section is configured such that the left portions thereof and the right portions thereof break alternately, the breaking section is easily made to break gradually depending on the magnitude of the tension.

If the breaking section includes the initially breaking portion, a starting point of the breakage is provided to the breaking section; and the breaking section is easily made to break in the initial stage of the inflation and deployment in which the airbag receives a large impulsive force.

If the stitched portion is provided to the breaking section, the breakage of the breaking section is easily stopped. Furthermore, if the stitched portion is angled, the tension applied to the breaking section that has been broken is made to act uniformly on the stitched portion.

If the extended breaking portion is provided in the widened portion, the length of the breaking section is reduced by the length of the extended breaking portion, whereby the widening length of the widened portion is reduced. Furthermore, if a plurality of breaking sections are provided, each of the length of the breaking sections is reduced, whereby the widening length of the widened portion is reduced.

If the tension member for the airbag is made of a material including predetermined threads, the base fabric is easily made to break with a tensile force applied to the breaking section with the tension applied between the two end portions.

In the airbag device according to the present invention described above, if the tension member for the airbag is applied to a tether that regulates the thickness or the area of contact of the airbag, the shape of the airbag, the opening and closing of the vent hole, and so forth, the tensile force is applied substantially continuously in the process of inflation and deployment of the airbag, whereby the shape or the function of the airbag is controlled effectively.

BRIEF DESCRIPTION OF THE DRAWINGS

FIG. 1 shows an overall configuration of an airbag device according to a first embodiment of the present invention, wherein

FIG. 2 shows a tension member for an airbag according to the first embodiment of the present invention, wherein

FIG. 3 shows an action of the tension member for the airbag according to the present embodiment, wherein

FIG. 4 shows different states of airbags that have been inflated and deployed, wherein FIG. 4(A) shows the airbag according to the present embodiment, FIG. 4(B) shows an airbag according to a known art, FIG. 4(C) shows the airbag according to the present embodiment when the occupant is in a normal position, and FIG. 4(D) shows the airbag according to the present embodiment when the occupant is in a close position.

FIG. 5 shows effects produced by the airbag device according to the present embodiment, wherein

FIG. 6 shows tension members for airbags according to other embodiments of the present invention in plan view, wherein FIG. 6(A) shows a second embodiment, FIG. 6(B) shows a third embodiment, and FIG. 6(C) shows a fourth embodiment.

FIG. 7 shows tension members for airbags according to yet other embodiments of the present invention in plan view, wherein

FIG. 8 shows a schematic configuration of airbag devices according to yet other embodiments of the present invention, wherein

DETAILED DESCRIPTION OF THE PREFERRED EMBODIMENTS

Figure 1A:
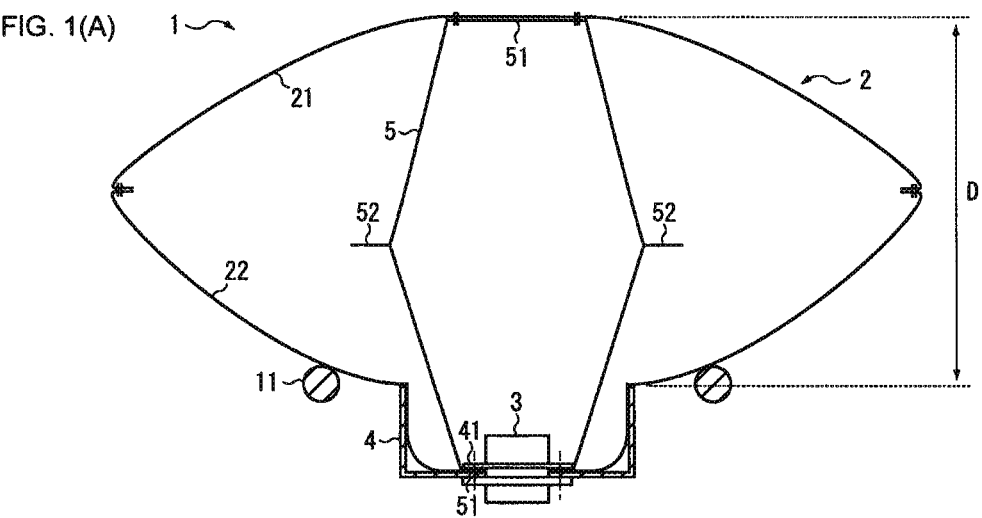
FIG. 1(A) is a sectional view.
Figure 1B:
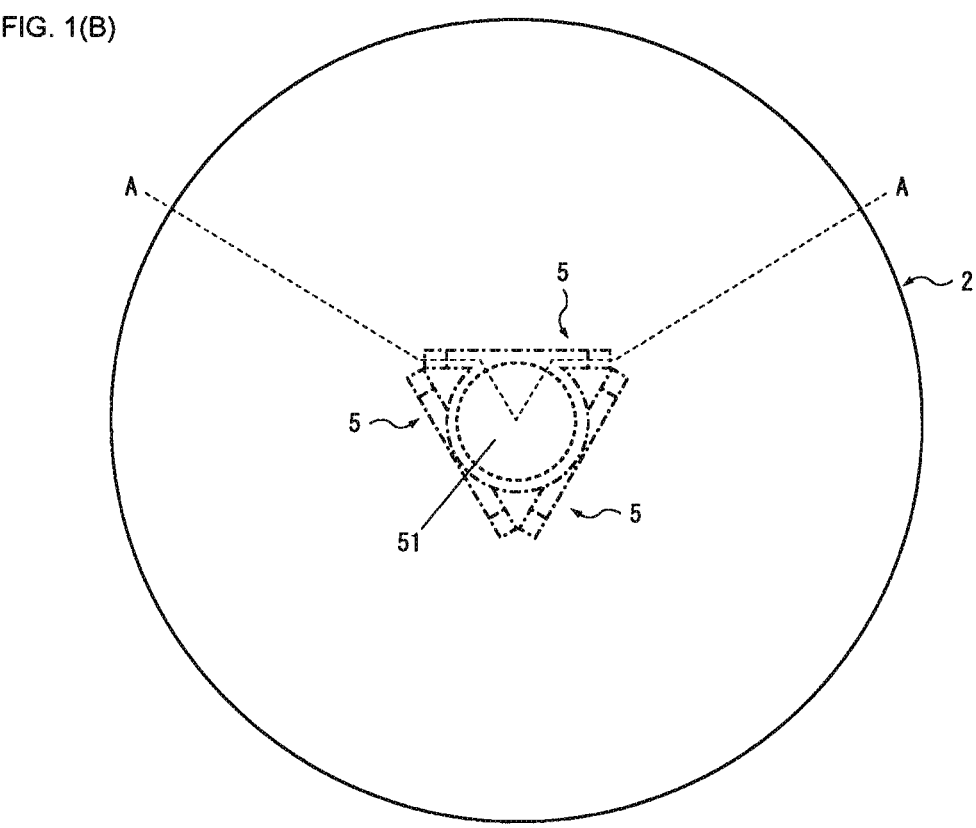
FIG. 1(B) is a front view.
Figure 2A:
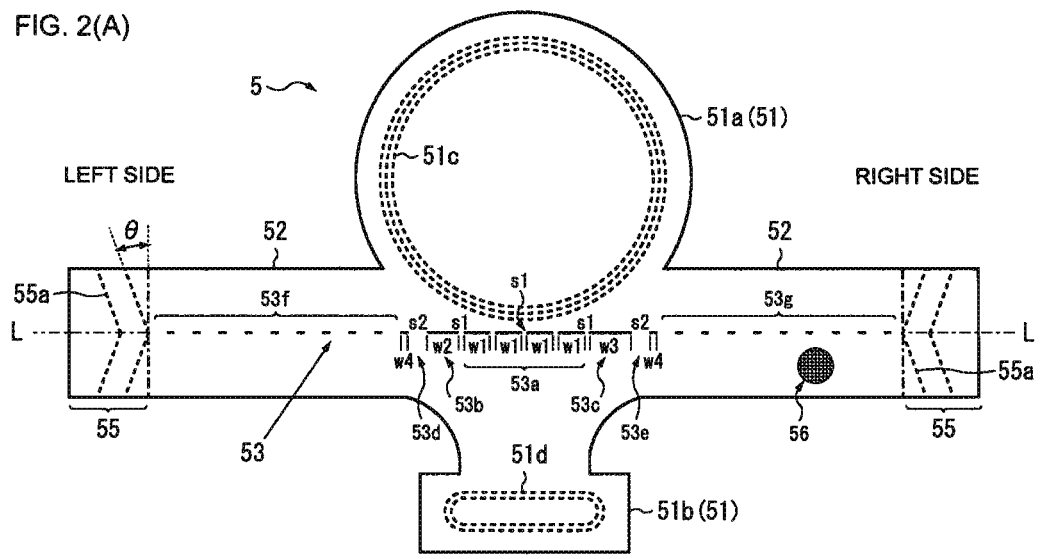
FIG. 2(A) is a plan view of the tension member for the airbag.
Figure 2B:
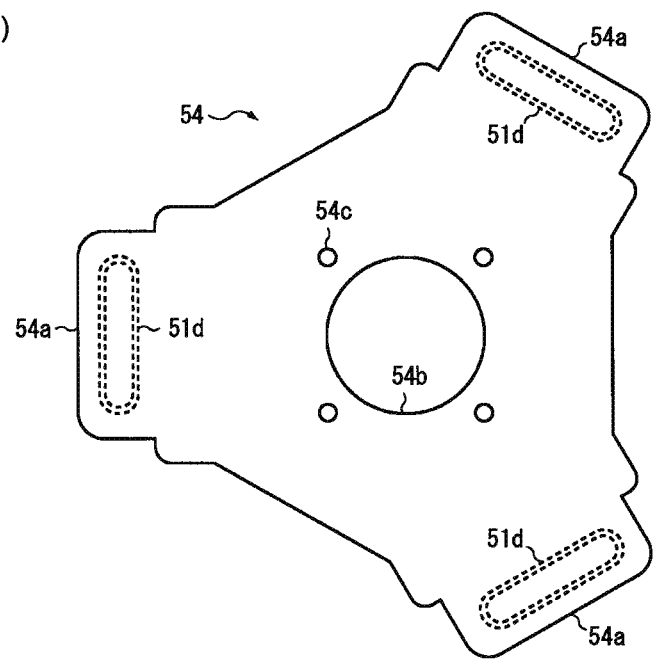
FIG. 2(B) is a plan view of a connecting member.

Embodiments of the present invention will now be described with reference to FIGS. 1 to 8. FIG. 1 shows an overall configuration of an airbag device according to a first embodiment of the present invention, wherein FIG. 1(A) is a sectional view, and FIG. 1(B) is a front view. FIG. 2 shows a tension member for an airbag according to the first embodiment of the present invention, wherein FIG. 2(A) is a plan view of the tension member for the airbag, and FIG. 2(B) is a plan view of a connecting member.

As illustrated in FIGS. 1 and 2, an airbag device 1 according to the first embodiment of the present invention includes an airbag 2 that is normally folded and is inflated and deployed in the case of an emergency, an inflator 3 for supplying gas into the airbag 2, a retainer 4 for retaining the airbag 2 and the inflator 3, and tension members 5 for airbags that control the shape or the function of the airbag 2 by using tension. The tension members 5 for airbags each include two end portions 51 connected to respective portions of the airbag 2 that are movable relative to each other when the airbag 2 is inflated and deployed, a widened portion 52 provided between the two end portions 51, and a breaking section 53 provided in the widened portion 52 in such a manner as to extend in a direction of widening of the widened portion 52 and configured to break depending on the magnitude of tension applied between the two end portions 51.

The airbag device 1 illustrated in FIGS. 1(A) and 1(B) is, for example, a driver airbag device and is housed in a pad portion (not illustrated) provided substantially in the center of a steering wheel 11 provided in front of the driver's seat. The airbag 2 that is folded and is housed in the pad portion starts to be inflated and deployed when gas is supplied thereinto with the activation of the inflator 3, is thrown out into the vehicle cabin by breaking the pad portion of the steering, and is inflated and deployed in front of an occupant in the driver's seat. The section illustrated in FIG. 1(A) is taken along line A-A illustrated in FIG. 1(B).

As illustrated in FIG. 1(A), for example, the airbag 2 includes a first piece of base fabric 21 forming a face thereof to be in contact with the occupant, and a second piece of base fabric 22 provided on a side thereof nearer to the steering wheel 11. The edges of the first piece of base fabric 21 and the second piece of base fabric 22 are stitched to each other, whereby a bag member forming the airbag 2 is provided. The second piece of base fabric 22 has an open portion provided substantially in the center thereof and in which the inflator 3 is fitted. The airbag 2 is retained by the retainer 4 as follows: a portion of the inflator 3 is inserted into the open portion of the second piece of base fabric 22, and a bag ring 41 is fitted thereonto from the inner side and is fastened with fastening members such as blots and nuts. As illustrated in FIG. 1(B), the airbag 2 is configured such that the face thereof to be in contact with the occupant has a substantially circular shape. The second piece of base fabric 22 of the airbag 2 may have a vent hole for exhausting the gas in the airbag to the outside.

The inflator 3 is a gas generator that generates gas to be supplied into the airbag 2. The inflator 3 has a substantially disc-like contour, for example. Although FIG. 1 illustrates a case where the inflator 3 is of a disc type, a cylinder-type inflator having a substantially round cylindrical contour may be employed. The inflator 3 is connected to a non-illustrated ECU (electronic control unit) and is controlled on the basis of measured values obtained by an acceleration sensor or the like. If the ECU detects or estimates a collision or sudden deceleration of the vehicle, the inflator 3 is ignited by an ignition current supplied from the ECU, generates gas by burning a chemical agent stored in the inflator 3, and supplies the gas into the airbag 2.

The retainer 4 for retaining the airbag 2 and the inflator 3 is housed in the pad portion of the steering, whereby an airbag module is provided. The pad portion is connected to, for example, a boss portion in such a manner as to be movable relative thereto, the boss portion being connected to a steering shaft, whereby a horn switch is provided between the pad portion and the boss portion. The steering wheel 11 is connected to the boss portion with a plurality of spokes. The configuration of the retainer 4 is not limited to the one illustrated. The retainer 4 may be changed to any of various known retainers that have been used generally.

The tension members 5 for airbags illustrated in FIGS. 1 and 2 are tethers that regulate a thickness D (the amount of projection from the retainer 4) of the airbag 2. As illustrated in FIG. 1(A), each of the tension members 5 for airbags includes a first end portion 51a connected to a top part (a substantially central part of the first piece of base fabric) of the airbag 2, and a second end portion 51b connected to a side of the airbag 2 that is nearer to the inflator 3. The two end portions 51 correspond to the first end portion 51a and the second end portion 51b, respectively.

The first end portion 51a has, for example, a substantially circular shape as illustrated in FIG. 2(A) and is stitched to the top part (the substantially central part of the first piece of base fabric) of the airbag 2 with stitch lines 51c. The second end portion 51b is connected to, for example, a connecting member 54 illustrated in FIG. 2(B). As illustrated in FIG. 2(B), the connecting member 54 includes three projecting portions 54a provided at phase differences of 120 degrees with respect to one another, an open portion 54b in which the inflator 3 is fitted, and insertion holes 54c into which fastening members such as bolts are inserted. As with the second piece of base fabric 22 of the airbag 2, the connecting member 54 is retained by being nipped between the retainer 4 and the bag ring 41.

The second end portion 51b of each of the tension members 5 for airbags is stitched to a corresponding one of the projecting portions 54a with stitch lines 51d. Connecting the tension members 5 for airbags with the connecting member 54 in such a manner makes it easy to connect the tension members 5 for airbags to the airbag 2. As illustrated in FIG. 1(B), the three tension members 5 for airbags are connected to the top part (the substantially central part of the first piece of base fabric) of the airbag 2 at the phase differences of 120 degrees with respect to one another, and the second end portions 51b are connected to the respective projecting portions 54a. With such a configuration, the tension members 5 for airbags are provided between the retainer 4 and the top part of the airbag 2. At the time of inflation and deployment of the airbag 2, the airbag 2 is inflated and deployed in a direction away from the retainer 4. Therefore, it can also be said that each first end portion 51a and each second end portion 51b (the two end portions 51) are connected to respective portions of the airbag 2 that are movable relative to each other when the airbag 2 is inflated and deployed. The number of tension members 5 for airbags is not limited to three and may be at least one.

As illustrated in FIG. 2(A), the widened portion 52 is provided between the first end portion 51a and the second end portion 51b (the two end portions 51). The widened portion 52 is a portion widened in a direction (the lateral direction) substantially perpendicular to a center line connecting the first end portion 51a and the second end portion 51b. The widened portion 52 has a laterally symmetrical contour and has the breaking section 53 in a substantially central part in the direction of widening thereof. The breaking section 53 includes, for example, a plurality of incisions or openings each extending in a direction substantially perpendicular to the tension that is applied between the two end portions Si. The incisions or openings are arranged at predetermined intervals and along a straight or curved line. The incisions may each be a simple cut or a narrow slit. The openings may each be a so-called pinhole or a small hole having a circular shape or a polygonal shape.

As illustrated in FIG. 2(A), the breaking section 53 includes, for example, initially breaking portions 53a in a central part thereof. The initially breaking portions 53a break uniformly in the lateral direction. The initially breaking portions 53a illustrated include four (two on each of the right and left sides) slits that each have a slit width w1 and are arranged at slit intervals s1. The initially breaking portions 53a provide a trigger (starting point) for the tension member 5 for an airbag to break at the breaking section 53. Particularly, in the initial stage of the inflation and deployment of the airbag 2, a large impulsive force tends to be applied to the tension member 5 for an airbag. Therefore, the tension member 5 for an airbag is designed to break over a relatively wide area thereof and uniformly in the lateral direction. The presence or absence, the length, the slit width w1, the slit interval s1, and other conditions of the initially breaking portions 53a are appropriately changed depending on conditions including the type and the capacity of the airbag 2, the gas pressure of the inflator 3, and so forth.

The breaking section 53 is configured such that left portions thereof and right portions thereof break alternately. Specifically, a second breaking portion 53b on the immediate left side of the initially breaking portions 53a has a slit width w2 and is at the slit interval s1, and a third breaking portion 53c on the immediate right side of the initially breaking portions 53a has a slit width w3 and is at the slit interval s1, the slit width w3 of the third breaking portion 53c being larger than the slit width w2 of the second breaking portion 53b. That is, a relationship of slit width w3>slit width w2 holds. Furthermore, a fourth breaking portion 53d on the immediate left side of the second breaking portion 53b has a slit width w4 and is at a slit interval s2, and a fifth breaking portion 53e on the immediate right side of the third breaking portion 53c has the slit width w4 and is at the slit interval s2, the fourth breaking portion 53d and the fifth breaking portion 53e having the same slit width w4 and being at the same slit interval s2. Furthermore, other breaking portions 53 (left-side breaking portions 53f and right-side breaking portions 53g) are provided subsequently on the left and right sides of the fourth breaking portion 53d and the fifth breaking portion 53e, respectively. The other breaking portions 53 are slits each having the slit width w4 and being arranged at the slit intervals s2.

Hence, after the initially breaking portions 53a break with a predetermined tension applied between the first end portion 51a and the second end portion 51b (the two end portions 51), the second breaking portion 53b and the third breaking portion 53c that are each at the slit interval s1 break substantially simultaneously with an increase in the tension. The second breaking portion 53b and the third breaking portion 53c have a relationship of slit width w3>slit width w2. Hence, if the tension further increases, a portion of the tension that is applied to the side having the second breaking portion 53b becomes larger than a portion of the tension that is applied to the side having the third breaking portion 53c. Accordingly the fourth breaking portion 53d breaks earlier than the fifth breaking portion 53e. If the tension further increases, the fifth breaking portion 53e breaks. Thereafter, with the increase in the tension, the following occurs repeatedly: after one of the left-side breaking portions 53f breaks, one of the right-side breaking portions 53g breaks.

As illustrated in FIG. 2(A), the widened portion 52 may include stitched portions 55 that stop the breakage of the breaking section 53. Specifically, the stitched portions 55 each have stitch lines 55a. In a state where the widened portion 52 is folded along the breaking section 53, the stitch lines 55a of each of the stitched portions 55 extend from a corresponding one of the ends of the breaking section 53 and is angled with respect to the direction of widening of the widened portion 52. Referring to FIG. 2(A), the stitched portions 55 are each doubled by being folded at a center line L thereof extending along the breaking section 53, and the doubled portion is stitched. The stitch lines 55a are not perpendicular to but are tilted toward the end by an angle θ with respect to the breaking section 53 (the center line L). The tension that breaks the breaking section 53 is concentrated in a central part of the widened portion 52 that extends along the center line L. Therefore, a portion of the tension that is applied to the central part of the widened portion 52 is larger than a portion of the tension that is applied to each of the edges of the widened portion 52 extending parallel to the center line L. Hence, if the stitch lines 55a are formed in a direction perpendicular to the breaking section 53, the tension remains concentrated in the central part in each of the stitched portions 55 that stop the breakage of the breaking section 53, that is, the stress is concentrated there. Hence, considering the levels of the tension to be applied to the central part and the tension to be applied to the edges, the angle θ is set such that a tension is applied uniformly along the stitch lines 55a.

The tension member 5 for an airbag is made of, for example, the base fabric used for the airbag 2. The base fabric forming the tension member 5 for an airbag includes threads 56 some of which run perpendicularly to the breaking section 53. In general, the threads 56 include a warp and a weft that form a grid pattern. Yarns of one of the warp and the weft extend perpendicularly to the breaking section 53, and threads of the other extend parallel to the breaking section 53. With such a configuration, the base fabric is easily broken by a tensile force applied to the breaking section 53 with a tension applied between the end portions 51. Thus, the tension is controlled stably. The threads 56 in the drawing are in partially enlarged view.

The material forming the tension member 5 for an airbag is not limited to the base fabric used for the airbag 2 and may be any other material, such as elastomer or resin, that withstands a predetermined tension and has an environmental resistance (exhibiting a certain level of performance in a temperature range of −40° C. to 80° C., for example). The term "tension member for an airbag" used herein is a general term that encompasses all elements that are used for controlling the tension to be applied to the airbag 2, such as tethers, straps, connecting members, patches, belts, anchoring wires, anchoring ropes, rope-like members, strip-like members, and so forth.

Figure 3A:
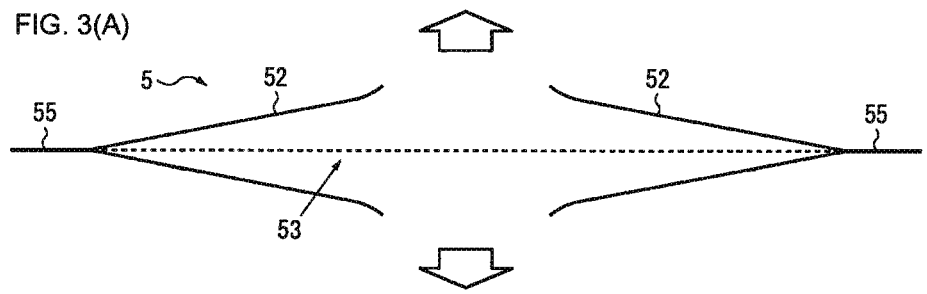
FIG. 3(A) shows an initial regulating stage.
Figure 3B:
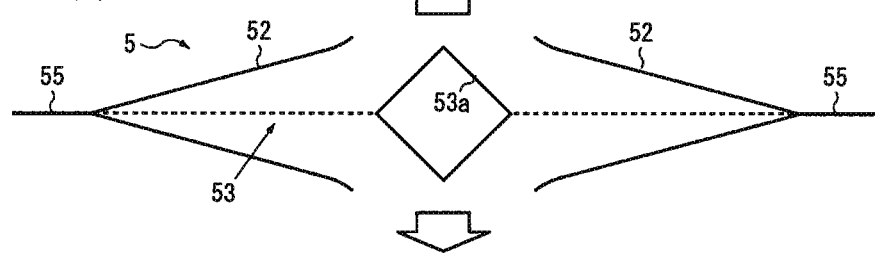
FIG. 3(B) shows a first breaking stage.
Figure 3C:
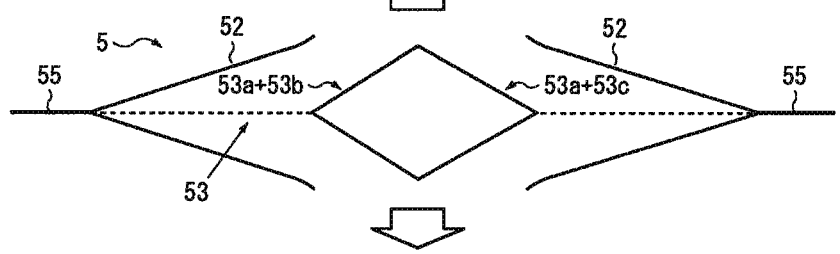
FIG. 3(C) shows a second breaking stage.
Figure 3D:
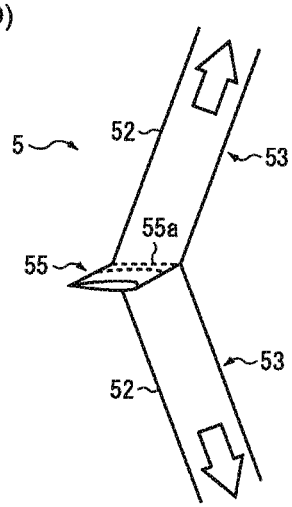
FIG. 3(D) shows a breakage stopping stage.

Now, an action of the tension member 5 for an airbag will be described with reference to FIG. 3. FIG. 3 shows an action of the tension member for the airbag according to the present embodiment, wherein FIG. 3(A) shows an initial regulating stage, FIG. 3(B) shows a first breaking stage, FIG. 3(C) shows a second breaking stage, and FIG. 3(D) shows a breakage stopping stage. In each of FIGS. 3(A)-3(C), the breaking section 53 is represented by a simple dotted line.

In the initial regulating stage illustrated in FIG. 3(A), the thickness (amount of projection) of the airbag 2 is regulated by the tension member 5 for an airbag with the breaking section 53 yet to be broken. When gas is ejected into the airbag 2 with the two end portions 51 connected to the airbag device 1, the first end portion 51a connected to the airbag 2 moves away from the second end portion 51b connected to the retainer along with the inflation and deployment of the airbag 2. Accordingly, the thickness (amount of projection) of the airbag 2 that has been inflated and deployed by an amount corresponding to the distance between the first end portion 51a and the second end portion 51b is regulated by the tension member 5 for an airbag. Hence, the gas is diffused radially.

In the first breaking stage illustrated in FIG. 3(B), the initially breaking portions 53a break. When the inflation and deployment of the airbag 2 further progresses from the state illustrated in FIG. 3(A), a predetermined tension acts on the tension member 5 for an airbag and breaks the initially breaking portions 53a first. The impulsive force acting in this stage is relatively high. Therefore, the initially breaking portions 53a break uniformly in the lateral direction.

In the second breaking stage illustrated in FIG. 3(C), the second breaking portion 53b and the third breaking portion 53c break. The second breaking portion 53b and the third breaking portion 53c are each at the same slit interval s1 from the initially breaking portions 53a. Therefore, when a predetermined tension acts on the tension member 5 for an airbag, the second breaking portion 53b and the third breaking portion 53c break substantially simultaneously. Here, there is a relationship of the slit width w2 of the second breaking portion 53b<the slit width w3 of the third breaking portion 53c. Hence, in a substantially diamond-shaped open portion formed by the breakage of the breaking section 53, the right side (the side having the third breaking portion 53c) is longer than the left side (the side having the second breaking portion 53b).

Therefore, if the tension further increases, the portion of the tension that is applied to the side having the second breaking portion 53b becomes larger than the portion of the tension that is applied to the side having the third breaking portion 53c. Consequently, the fourth breaking portion 53d illustrated in FIG. 2(A) breaks earlier than the fifth breaking portion 53e. That is, the left side of the breaking section 53 breaks earlier than the right side of the breaking section 53. If the tension further increases, the fifth breaking portion 53e illustrated in FIG. 2(A) breaks. Thereafter, with the increase in the tension, the following occurs repeatedly: after one of the left-side breaking portions 53f illustrated in FIG. 2(A) breaks, one of the right-side breaking portions 53g illustrated in FIG. 2(A) breaks. Thus, according to the present embodiment, the tensile force is applied substantially continuously over a period of time from the initial stage to the completing stage of the inflation and deployment of the airbag 2.

In the breakage stopping stage illustrated in FIG. 3(D), the breakage of the breaking section 53 reaches the stitched portions 55. With the repetition of breakage of the breaking section 53 occurring alternately on the left side and on the right side, the breakage ultimately reaches the stitched portions 55 and stops. Depending on the level of the tension, the capacity of the airbag 2, and other conditions, the stitched portions 55 may be omitted and the breakage of the breaking section 53 may be stopped simply by utilizing the strength of the base fabric. Nevertheless, providing the stitched portions 55 at the breakage stopping portions suppresses excessive breakage that may occur depending on the force of breaking the breaking section 53. Therefore, the accuracy of controlling the tension is improved. Moreover, the thickness (the amount of projection) of the airbag 2 is regulated by the tension member 5 for an airbag whose breaking section 53 has been broken to the maximum extent.

Figure 5A:
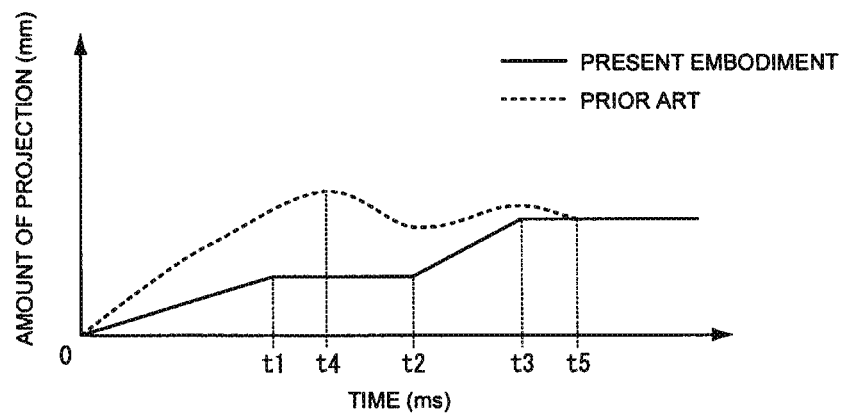
FIG. 5(A) shows changes in the amount of projection versus time.
Figure 5B:
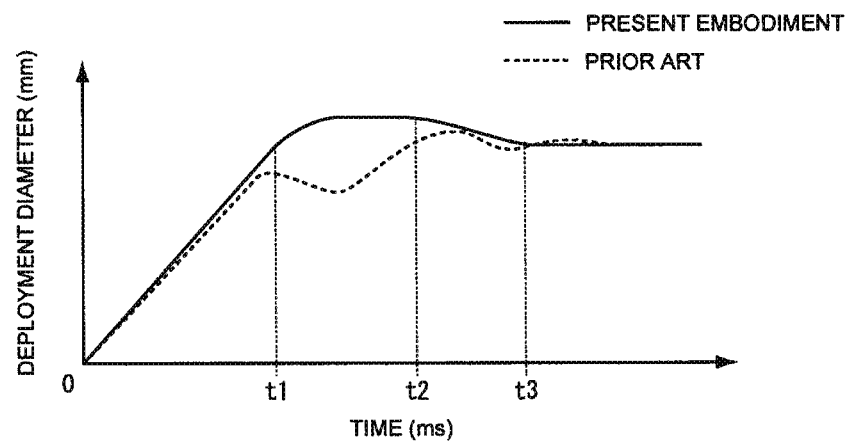
FIG. 5(B) shows changes in the deployment diameter versus time.

Now, effects produced by the airbag device 1 including the above tension member 5 for an airbag will now be described. FIG. 4 shows different states of airbags that have been inflated and deployed, wherein FIG. 4(A) shows the airbag according to the present embodiment, FIG. 4(B) shows an airbag according to a known art, FIG. 4(C) shows the airbag according to the present embodiment when the occupant is in a normal position, and FIG 4(D) shows the airbag according to the present embodiment when the occupant is in a close position. FIG. 5 shows effects produced by the airbag device according to the present embodiment, wherein FIG. 5(A) shows changes in the amount of projection versus time, and FIG. 5(B) shows changes in the deployment diameter versus time. In each of FIGS. 5(A) and 5(B), the solid line represents the result of a measurement obtained in the present embodiment, and the dotted line represents the result of a measurement obtained in the known art.

As illustrated in FIG. 4(A), in the airbag device 1 according to the present embodiment, since the tension member 5 for an airbag according to the present embodiment is provided in the airbag 2, the airbag 2 is gradually inflated and deployed while the shape thereof changes in order of a state 2a, a state 2b, a state 2c, and a state 2d. This is also apparent from the result of the measurement of the amount of projection graphed in FIG. 5(A).

In FIG. 5(A), the amount of projection of the airbag 2 (the distance from the retainer 4 to the top part of the airbag 2) gradually increases before time t1, is maintained at a certain level from time t1 to time t2, gradually increases from time t2 to time t3, and is maintained at a certain level again after time t3. The period before time t1 means the time required for the two end portions 51 of the tension member 5 for an airbag to spread. The period before time t2 means the time for which the tension member 5 for an airbag is kept unbroken and is maintained to have a certain length. The period before time t3 means the time during which the breaking section 53 of the tension member 5 for an airbag breaks and the tension member 5 for an airbag is expanded. The period after time t3 means the time for which the tension member 5 for an airbag is maintained to have the maximum expandable length after the breakage is stopped.

In contrast, in an airbag device 10 according to the known art illustrated in FIG. 4(B), a common tether is provided in an airbag 20. In general, it is known that the airbag 20 is inflated and deployed while the shape thereof changes in order of a state 20a, a state 20b, a state 20c, and a state 20d. That is, before the airbag 20 is completely inflated and deployed, the airbag 20 projects forward significantly and is then pulled back. This is also apparent from the result of the measurement of the amount of projection graphed in FIG. 5(B).

Referring to FIG. 5(A), the amount of projection of the airbag 20 reaches the maximum at time t4, gradually falls within a range corresponding to the completion of the inflation and deployment while fluctuating, and is stabilized at time t5. That is, after the airbag 20 projects with a great force, the airbag 20 is pulled back by the tether, repeatedly moves back and forth as if it bounces, and then comes to have the final shape. Hence, in the airbag device 10 according to the known art, while the airbag 20 is being inflated and deployed, the airbag 20 projects forward more than in its final shape or it takes time for the airbag 20 to be stabilized in the final shape. In contrast, in the airbag device 1 according to the present embodiment represented by the solid line in the same graph, the airbag 2 is made to project gradually with time. It is easily understood that the shape of the airbag 2 is controlled with high accuracy.

Furthermore, in the airbag device 1 according to the present embodiment, since the amount of projection is controlled with high accuracy as illustrated in FIG. 4(A), the deployment diameter (the area of contact of the airbag 2) is also controlled with high accuracy as graphed in FIG. 5(B).

Referring to FIG. 5(B), the deployment diameter of the airbag 2 (the distance from the upper end to the lower end of the airbag 2 that has been inflated and deployed) gradually increases before a point around time t1, reaches the maximum at a point slightly after time t1, is maintained at a certain level until time t2, gradually decreases from time t2 to time t3, and is stabilized with a predetermined size after time t3. The period before time t1 means the time required for the two end portions 51 of the tension member 5 for an airbag to spread. The period before time t2 means the time for which the tension member 5 for an airbag is kept unbroken and is maintained to have a certain length. The period before time t3 means the time during which the breaking section 53 of the tension member 5 for an airbag breaks and the tension member 5 for an airbag is expanded. The period after time t3 means the time for which the tension member 5 for an airbag is maintained to have the maximum expandable length after the breakage is stopped.

In contrast, as graphed by the dotted line in FIG. 5(B), in the airbag device 10 according to the known art, the deployment diameter also fluctuates before being stabilized with a predetermined size, in correspondence with the amount of projection of the airbag 20. Hence, in the airbag device 10 according to the known art, it is difficult to accurately control the deployment diameter of the airbag 20 that is being inflated and deployed. In contrast, in the airbag device 1 according to the present embodiment, the deployment diameter is larger than that of the known art in the initial stage, the area of contact with the occupant colliding thereto is assuredly provided in an earlier stage, the amount of projection is increased while the fluctuation in the deployment diameter is suppressed, and the shape of inflation and deployment of the airbag 2 is controlled in the most suitable way for protecting the occupant.

Furthermore, since the fluctuation of the airbag 2 in the direction of projection and in the direction of deployment diameter is suppressed in the process of inflation and deployment of the airbag 2, the internal pressure of the airbag 2 is prevented from becoming negative, allowing the gas to be diffused uniformly, whereby the gas is exhausted normally from the vent hole.

Furthermore, in the airbag device 1 according to the present embodiment, the breaking section 53 breaks depending on the magnitude of the tension applied to the tension member 5 for an airbag. Therefore, if any situation occurs that prevents the increase in the tension applied to the tension member 5 for an airbag in the process of inflation and deployment of the airbag 2, the breaking section 53 of the tension member 5 for an airbag stops breaking and maintains to have its current length.

For example, when an occupant P (or a dummy) is normally in the driver's seat as illustrated in FIG. 4(C), the amount of projection of the airbag 2 is suppressed depending on the distance from the steering wheel 11. The distance from the airbag 2 is smaller in a part of the occupant P around the chest than in a part of the occupant P around the head. Therefore, the breakage of the tension member 5 for an airbag is suppressed when a lower portion of the airbag 2 comes into contact with the chest, whereby the amount of projection is maintained to be small. The amount of projection of the airbag 2 is controlled such that the breakage of the tension member 5 for an airbag is suppressed at the contact with the occupant P. Hence, the occupant P does not receive any locally high pressure.

Even if the occupant P (or the dummy) is closer to the steering wheel 11 as illustrated in FIG. 4(D) than in the normal state, the amount of projection of the airbag 2 is controlled because the breakage of the tension member 5 for an airbag is suppressed at the contact with the occupant P. Therefore, the pressure and the impulsive force to be applied to the occupant P are suppressed.

Figure 7A:
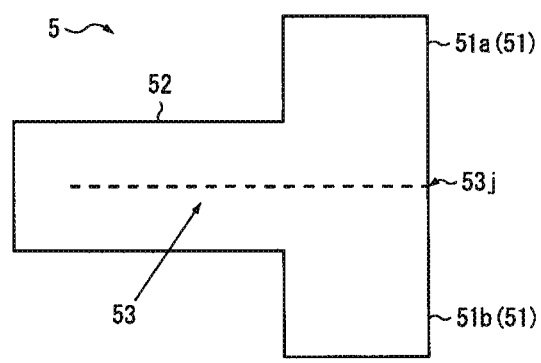
FIG. 7(A) shows a fifth embodiment.
Figure 7B:
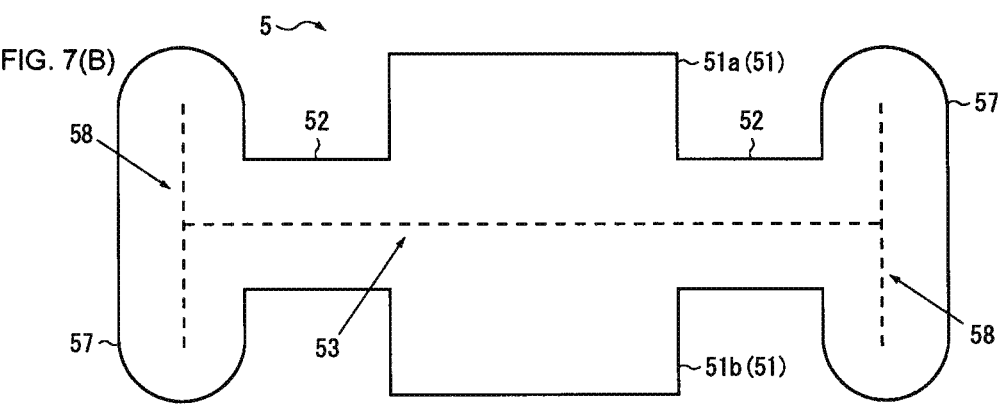
FIG. 7(B) shows a sixth embodiment.
Figure 7C:
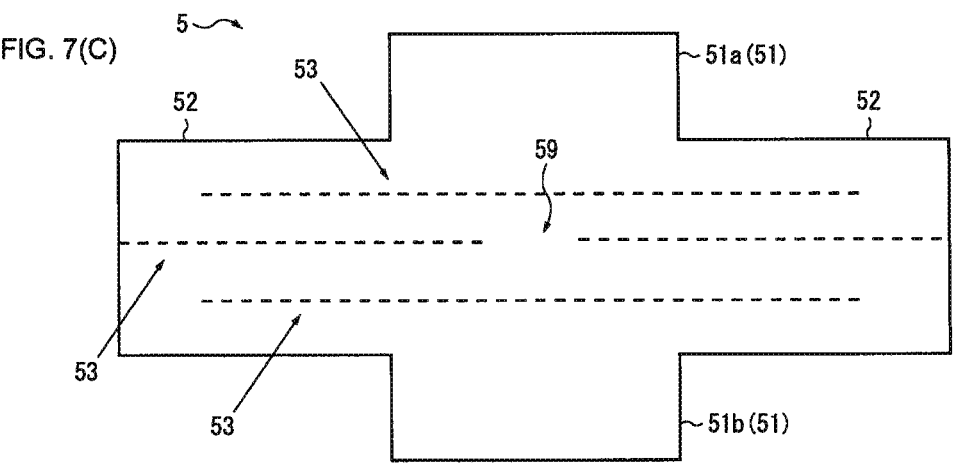
FIG. 7(C) shows a seventh embodiment.

Now, tension members 5 for airbags according to other embodiments of the present invention will be described with reference to FIGS. 6 and 7. FIG. 6 shows tension members for airbags according to other embodiments of the present invention in plan view, wherein FIG. 6(A) shows a second embodiment, FIG. 6(B) shows a third embodiment, and FIG. 6(C) shows a fourth embodiment. FIG. 7 shows tension members for airbags according to yet other embodiments of the present invention in plan view, wherein FIG. 7(A) shows a fifth embodiment, FIG. 7(B) shows a sixth embodiment, and FIG. 7(C) shows a seventh embodiment. Elements that are the same as those included in the tension member 5 for an airbag according to the present embodiment described above are denoted by corresponding reference numerals, and redundant description thereof is thus omitted.

In the tension member 5 for an airbag according to the second embodiment illustrated in FIG. 6(A), the breaking section 53 includes uniform slits (provided with a slit width w and at regular slit intervals s). In such a case where the breaking section 53 includes the uniform slits, the tensile force is also applied substantially continuously over a period of time from the initial stage to the completing stage of the inflation and deployment of the airbag 2 by appropriately setting the slit width w and the slit interval s.

The tension member 5 for an airbag according to the third embodiment illustrated in FIG. 6(B) is obtained by adding the initially breaking portions 53a to the tension member 5 for an airbag according to the second embodiment. In such a configuration, the tensile force is applied substantially continuously over a period of time from the initial stage to the completing stage of the inflation and deployment of the airbag 2 while the impact to be applied in the initial stage of the inflation and deployment of the airbag 2 is reduced.

The tension member 5 for an airbag according to the fourth embodiment illustrated in FIG. 6(C) is obtained by modifying the tension member 5 for an airbag according to the third embodiment such that the breaking portions 53 provided on the right and left sides of the initially breaking portions 53a form slits whose size (slit width w and slit interval s) is reduced in a graded manner. Specifically, the slits forming first-stage breaking portions 53h are provided with a smaller slit width w and at smaller slit intervals s than the slits forming the initially breaking portions 53a, and the slits forming second-stage breaking portions 53i are provided with a smaller slit width w and at smaller slit intervals s than the slits forming the first-stage breaking portions 53h. Although the slit width w and the slit interval s are each set among three sizes, the slit width w and the slit interval s may each be set among four or more sizes or may be gradually reduced from the central part toward the ends on both sides.

Depending on the function of the airbag 2, the slits forming the first-stage breaking portions 53h may be provided with a larger slit width w and at larger slit intervals s than the slits forming the initially breaking portions 53a, and the slits forming the second-stage breaking portions 53i may be provided with a larger slit width w and at larger slit intervals s than the slits forming the first-stage breaking portions 53h.

The widened portion 52 of the tension member 5 for an airbag according to the fifth embodiment illustrated in FIG. 7(A) is provided only on one of the right and left sides of the tension member 5 for an airbag. In such a configuration, the breaking section 53 starts to break from a starting point 53j defined on the side not having the widened portion 52, and the tensile force is applied substantially continuously over a period of time from the initial stage to the completing stage of the inflation and deployment of the airbag 2, as in the embodiment described above.

In the tension member 5 for an airbag according to the sixth embodiment illustrated in FIG. 7(B), the widened portion 52 includes extended portions 57 extending in a direction substantially perpendicular to the direction of widening of the widened portion 52, and the extended portions 57 include respective extended breaking portions 58 continuous with the breaking section 53 and extending in the direction of extension thereof. If such extended breaking portions 58 are provided at two ends of the widened portion 52, the length of the breaking section 53 is reduced by the length of the extended breaking portions 58. Consequently, the widening length of the widened portion 52 is reduced.

The tension member 5 for an airbag according to the sixth embodiment is suitable for a case where the airbag 2 has a large capacity and the amount of projection of the airbag 2 is large as with a passenger airbag, for example. Although the extended portions 57 are provided at the two respective ends of the widened portion 52 in the drawing, an extended portion 57 may be provided in a central part of the widened portion 52. Alternatively, two or more extended portions 57 may be provided on each of the right and left sides of the widened portion 52.

The tension member 5 for an airbag according to the seventh embodiment illustrated in FIG. 7(C) includes a plurality of breaking sections 53 in the widened portion 52. Specifically, the breaking sections 53 are arranged parallel to one another. One of the breaking sections 53 that is in the center starts to break from the two ends of the widened portion 52 and includes an island portion 59 provided in a central part of the widened portion 52. The island portion 59 can function as a tether (tension generating member). If such a plurality of breaking sections 53 are provided, each of the length of the breaking sections 53 is reduced, whereby the widening length of the widened portion 52 is reduced. The slit widths w and the slit intervals s of the breaking sections 53 arranged parallel to one another are set appropriately considering the order of breakage.

Any of the breaking sections 53 according to the first to fourth embodiments may be selectively applied to each of the tension members 5 for airbags according to the fifth to seventh embodiments.

Now, airbag devices 1 according to other embodiments of the present invention will be described with reference to FIG.

Figure 8A:
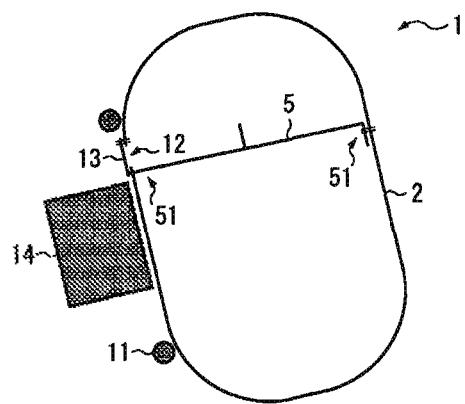
FIG. 8(A) shows a second embodiment.
Figure 8B:
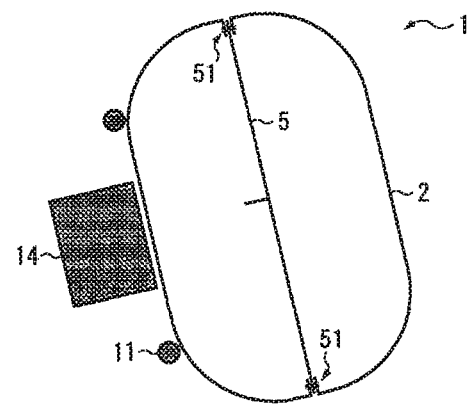
FIG. 8(B) shows a third embodiment.
Figure 8C:
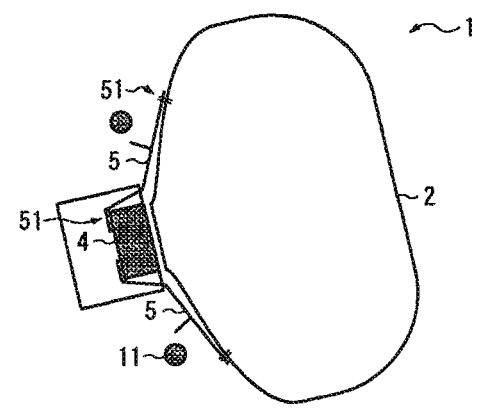
FIG. 8(C) shows a fourth embodiment.

8. FIG. 8 shows a schematic configuration of airbag devices according to yet other embodiments of the present invention, wherein FIG. 8(A) shows a second embodiment, FIG. 8(B) shows a third embodiment, and FIG. 8(C) shows a fourth embodiment. Elements that are the same as those of the airbag device 1 according to the first embodiment described above are denoted by corresponding reference numerals, and redundant description thereof is thus omitted.

The airbag device 1 according to the second embodiment illustrated in FIG. 8(A) employs the tension member 5 for an airbag according to the present embodiment as a tether that regulates the opening and closing of a vent hole 12 provided in the airbag 2. For example, the tension member 5 for an airbag is employed as a tether that connects one end of a valve member 13 and a top part of the airbag 2 to each other, the valve member 13 being capable of covering the vent hole 12, the other end of the valve member 13 being stitched to an edge of the vent hole 12. The tension member 5 for an airbag passes through a slit portion provided in the airbag 2 and connects the one end of the valve member 13 and the top part of the airbag 2 to each other. Although the airbag 2 is housed in the pad portion forming a steering body portion 14, the drawing conceptually illustrates a state where the airbag 2 has been inflated and deployed.

According to the second embodiment, the tensile force is applied to the valve member 13 substantially continuously in the process of inflation and deployment of the airbag 2, and the vent hole 12 is kept closed by the valve member 13 over a period of time from the initial stage to the completing stage of the inflation and deployment of the airbag 2. Thus, the function of the openable and closable vent hole 12 is substantially constantly exerted in the process of inflation and deployment of the airbag 2. The configuration of the openable and closable vent hole 12 is not limited to the one illustrated. Various other types of vent holes are also applicable to the tension member 5 for an airbag according to the present embodiment, such as a vent hole provided with a cylindrical duct, a vent hole provided with a tent-type projecting portion, and so forth.

The airbag device 1 according to the third embodiment illustrated in FIG. 8(B) employs the tension member 5 for an airbag according to the present embodiment as a tether that regulates the area of contact (deployment diameter) of the airbag 2. For example, the two end portions 51 of the tension member 5 for an airbag are positioned inside the airbag 2 by each being stitched to a stitched portion between the first piece of base fabric 21 and the second piece of base fabric 22 that form the airbag 2. Only a single tension member 5 for an airbag that regulates the area of contact (deployment diameter) of the airbag 2 may be provided in such a manner as to extend in the vertical direction or in the lateral direction of the airbag 2. Alternatively, two tension members 5 for airbags may be provided in such a manner as to extend in the vertical direction and in the lateral direction, respectively, of the airbag 2. Alternatively, three or more tension members 5 for airbags may be provided at regular phase differences with respect to one another.

According to the third embodiment, the tensile force is applied substantially continuously not only in the thickness direction of the airbag 2 but also in the direction of deployment diameter in the process of inflation and deployment of the airbag 2. Hence, the thickness and the area of contact (deployment diameter) of the airbag 2 are controlled over a period of time from the initial stage to the completion of the inflation and deployment of the airbag 2. The airbag device according to the third embodiment is suitable for, for example, a case where the airbag 2 has a large capacity and a large deployment diameter (deployment width) as with a passenger airbag, and a case where the airbag device includes a plurality of bag members such as twin airbags.

The airbag device 1 according to the fourth embodiment illustrated in FIG. 8(C) employs the tension member 5 for an airbag according to the present embodiment as a tether that regulates the shape of the airbag 2. For example, the two end portions 51 of the tension member 5 for an airbag are connected to the outer surface of the airbag 2 and to a part of the retainer 4, respectively. That is, the tension member 5 for an airbag is applicable not only to a case where the tension member 5 for an airbag is provided inside the airbag 2 but also to a tether that is provided on the outside of the airbag 2.

According to the fourth embodiment, the tensile force is applied substantially continuously in the process of inflation and deployment of the airbag 2, and the shape of the airbag 2 is controlled over a period of time from the initial stage to the completion of the inflation and deployment of the airbag 2.

Any of the tension members 5 for airbags according to the first to seventh embodiments may be selectively applied to each of the airbag devices 1 according to the second to fourth embodiments.

The present invention is not limited to the above embodiments. For example, the airbag device 1 may be a passenger airbag device, a side airbag device, a curtain airbag device, a knee airbag device, a pedestrian airbag device, or the like. That is, various changes can be made to the embodiments, of course, without departing from the scope of the present invention.

What is claimed is:

1. A tension member for an airbag connected to an airbag that is normally folded and housed in a structure of a vehicle and is inflated and deployed with gas supplied thereinto in a case of an emergency, the tension member being configured to control a shape or a function of the airbag by using tension, the tension member comprising:
two end portions connected to respective portions of the airbag that are movable relative to each other when the airbag is inflated and deployed, a widened portion provided between the two end portions, and a breaking section provided in the widened portion in such a manner as to extend in a direction of widening of the widened portion and configured to break depending on a magnitude of the tension applied between the two end portions, wherein the breaking section is configured such that left portions thereof and right portions thereof break alternately.

2. The tension member for the airbag according to claim 1, wherein the breaking section includes a plurality of incisions or openings each extending in a direction substantially perpendicular to the tension applied between the two end portions.

3. The tension member for the airbag according to claim 1, wherein the breaking section includes an initially breaking portion provided in a central part thereof and configured to break uniformly in a lateral direction.

4. The tension member for the airbag according to claim 1, wherein the widened portion includes an extended portion extending in a direction substantially perpendicular to the direction of widening, and the extended portion includes an extended breaking portion continuous with the breaking section and extending in a direction of extension thereof.

5. The tension member for the airbag according to claim 1, wherein the breaking section is one of a plurality of breaking sections provided in the widened portion.

6. The tension member for the airbag according to claim 1, wherein a material of the tension member for the airbag includes threads running perpendicularly to the breaking section.

7. The tension member for the airbag according to claim 1, wherein the widened portion includes a stitched portion that stops breakage of the breaking section.

8. The tension member for the airbag according to claim 7, wherein the stitched portion has a stitch line extending, in a state where the widened portion is folded along the breaking section, from an end of the breaking section and being angled with respect to the direction of widening of the widened portion.

9. An airbag device comprising an airbag that is normally folded and is inflated and deployed in a case of an emergency; an inflator for supplying gas into the airbag; a retainer for retaining the airbag and the inflator; and a tension member for the airbag that controls a shape or a function of the airbag by using tension, wherein the tension member is the tension member according to claim 1.

10. The airbag device according to claim 9, wherein the tension member for the airbag is employed as a tether that regulates a thickness of the airbag, a tether that regulates an area of contact of the airbag, a tether that regulates a shape of the airbag, or a tether that regulates opening and closing of a vent hole provided in the airbag.

* * * * *